(12) United States Patent
LV

(10) Patent No.: US 10,712,128 B2
(45) Date of Patent: Jul. 14, 2020

(54) SENSING AND ADJUSTMENT SYSTEM

(71) Applicant: SHENZHEN GONGFENXIANG NETWORK TECHNOLOGY CO., LTD., Shenzhen (CN)

(72) Inventor: Liang LV, Shenzhen (CN)

(73) Assignee: SHENZHEN GONGFENXIANG NETWORK TECHNOLOGY CO., LTD., Shenzhen (CN)

( * ) Notice: Subject to any disclaimer, the term of this patent is extended or adjusted under 35 U.S.C. 154(b) by 142 days.

(21) Appl. No.: 16/158,288

(22) Filed: Oct. 11, 2018

(65) Prior Publication Data

US 2019/0113307 A1 Apr. 18, 2019

(30) Foreign Application Priority Data

Oct. 13, 2017 (CN) .......................... 2017 1 0957510
Nov. 10, 2017 (CN) .......................... 2017 1 1107462
Nov. 10, 2017 (CN) .......................... 2017 1 1108105

(51) Int. Cl.
*F41G 1/38* (2006.01)
*G02B 7/00* (2006.01)
*G02B 23/00* (2006.01)
*F41A 27/20* (2006.01)
*F41G 11/00* (2006.01)
*F41G 1/54* (2006.01)

(52) U.S. Cl.
CPC ................ *F41G 1/38* (2013.01); *F41A 27/20* (2013.01); *F41G 11/001* (2013.01); *G02B 7/004* (2013.01); *G02B 23/00* (2013.01); *F41G 1/545* (2013.01)

(58) Field of Classification Search
CPC .......... F41G 1/38; F41G 11/001; F41G 1/545; G02B 23/00; G02B 7/004; F41A 27/20; G05D 3/20; G05D 3/01; G05D 3/12
See application file for complete search history.

(56) References Cited

U.S. PATENT DOCUMENTS

2004/0231220 A1* 11/2004 McCormick ............ F41G 1/473
42/120

* cited by examiner

*Primary Examiner* — Sonji N Johnson

(57) ABSTRACT

A sensing and adjustment system for a telescopic sight includes a plurality of sensing portions, a plurality of driving portions and a central controlling portion respectively fixed to a main body of the telescopic sight, a setting portion, a displaying portion, a plurality of fixing portions, a plurality of transmitting portions each fixed to a corresponding adjusting knob. Each sensing portion includes an angle position sensor and a gear and is configured to perceive a rotation angle of the corresponding adjusting knob and then transmitted to the central controlling portion. The fixing portion fixes the sensing portions and driving portions to the main body and close to their corresponding adjusting knob so that the gear of the sensing portions and driving portions is meshed with a corresponding gear of the transmitting portion. The central controlling portion can calculate an adjusting quantity of each adjusting knob according to setting data set by the setting portion and angle data perceived by the sensing portion and simultaneously drive the driving portion to automatically adjust the corresponding adjusting knob via the transmitting portion according to a received objective adjusting quantity.

13 Claims, 3 Drawing Sheets

SENSING AND ADJUSTMENT SYSTEM

CROSS-REFERENCE TO RELATED APPLICATION

The present application claims foreign priority of Chinese Patent Application No. 2017109575101, filed on Oct. 13, 2017, Chinese Patent Application No. 2017111074623, filed on Nov. 10, 2017, and Chinese Patent Application No. 2017111081059, filed on Nov. 10, 2017, in the State Intellectual Property Office of China, the contents of all of which are hereby incorporated by reference.

BACKGROUND

1. Technical Field

The present disclosure generally relates to sensing and adjustment system fields, and especially relates to a telescopic sight assembly including the sensing and adjustment system.

2. Description of Related Art

Rifle sights, especially the traditional telescopic sights, since its invention, had been widely used in sports, hunting and military activities for their viewing clarity and their accuracy to hit a target. In general, it is very difficult to hit a long distance target because of the curved trajectory of a bullet's path, which is formed by the joint effect of the gravity and wind. A shooter needs to measure the distance of the target, calculate a trajectory and adjust the turrets of the telescopic sight to achieve the long distance hit. However, to perform the above mentioned tasks require the shooter to remove his eyesight away from the target inside telescopic sight, and these time-consuming tasks keep the shooter's attention away from the battle or hunting field. Nowadays, the shooting technology has entered an age of artificial intelligence, many smart devices such as rangefinders, ballistic calculation mobile APPs, etc., had appeared. Because these smart devices and the telescopic sights are isolated from each other, no matter how advanced they are individually, they are not a linked system to coordinate with each other. In practice, the target is tended to be moving so that shooting opportunities can last only for a short time. In this way, there is no devices that allows the shooter to quickly and directly see the instant adjusting quantity of the telescopic sight turrets and the magnification power ring from a displaying screen, there is no devices that can directly link the smart devices with the telescopic sight so that the smart devices can get the instant adjusting quantity of the telescopic sight turrets and the magnification power ring and calculate these ballistic information to further adjust the telescopic sight turrets and magnification power ring to achieve an accurate target hit. At the same time, there is also no devices that can automatically adjust the telescopic sight turrets according to the smart calculation result, thereby the shooting efficiency is greatly reduced.

SUMMARY

The technical problems to be solved: in view of the shortcomings of the related art, the present disclosure relates to a sensing and adjustment system used on a telescopic sight which can allow the shooter to achieve a fast and accurate long distance target hit without manual operations and greatly improve the efficiency of the telescopic sight.

The technical solution adopted for solving technical problems of the present disclosure is:

a sensing and adjustment system used on a telescopic sight, with the telescopic sight including a plurality of turrets, a magnification power ring and a main body, each of the turrets and the magnification power ring called an adjusting knob herein, includes a plurality of sensing portions, a plurality of driving portions, a setting portion, a central controlling portion, a displaying portion, a plurality of fixing portions and a plurality of transmitting portions, each transmitting portion fixed to a corresponding adjusting knob and including a first gear. The sensing portion includes an angle position sensor and a second gear fixed to a first rotation shaft of the angle position sensor and meshed with a corresponding first gear. The angle position sensor is configured to perceive a rotation angle of the second gear. Each angle position sensor is fixed to the main body of the telescopic sight near the corresponding adjusting knob and configured to perceive a rotation angle of the corresponding adjusting knob via the transmitting portion and then transmits the rotation angle data to the central controlling portion. The driving portion includes a driving motor and a third gear fixed to a second rotation shaft of the driving motor and meshed with a corresponding first gear, the driving motor configured to drive the third gear to rotate. Each driving motor is fixed to the main body of the telescopic sight near the corresponding adjusting knob. The central controlling portion is configured to apply a driving voltage to the driving motor of the corresponding driving portion and drive the corresponding adjusting knob to rotate via the third gear and the first gear. Each of the fixing portions is configured to fix corresponding sensing portions, corresponding driving portions and the central controlling portion to the main body of the telescopic sight. The central controlling portion includes a first transmission module and a controlling and processing module. The setting portion is connected to the central controlling portion and configured to set setting data of the sensing portions and transmit the setting data to the central controlling portion. The displaying portion is connected to the central controlling portion. The controlling and processing module is configured to calculate a current adjusting quantity of the adjusting knob according to the setting data and the rotation angle data of a corresponding adjusting knob so as to convert the adjusting quantity of the adjusting knob from a physical value into a numeric value which can be displayed on a screen as a specific number, and the central controlling portion is then configured to transmit the numeric adjusting quantity of the adjusting knob to the displaying portion or/and other devices. The controlling and processing module is configured to calculate an adjusting angle of the adjusting knob according to the current adjusting quantity of the adjusting knob and an objective adjusting quantity received for the adjusting knob and simultaneously apply a driving voltage to the driving motor of the corresponding driving portion to automatically adjust the corresponding adjusting knobs.

Wherein the instant adjusting quantity of the adjusting knob is calculated by the following formula: $E=et*X+S$; wherein E is the current adjusting quantity of an adjusting knob, et is an unit adjusting quantity of an adjusting knob, S is a reference value, and X is a rotation angle of an adjusting knob perceived by the sensing portion; and wherein the unit adjusting quantity of the adjusting value of an adjusting knob is calculated by the following formula: $et=e/a$; wherein a is the rotation angle of an adjusting knob perceived by the sensing portion when the adjusting knob is rotated from one adjusting point to another adjusting point, and e is an adjusting range quantity between the two adjusting points read from the adjusting scale of the adjusting knob.

Wherein the reference value is: a certain point between the one adjusting point and the another adjusting point set as a reference point, the adjusting value of the adjusting knob on the reference point is taken as a reference quantity by the central controlling portion to calculate the adjusting quantity of the adjusting knob between the one adjusting point and the another adjusting point, and the reference quantity is the reference value between the one adjusting point and the another adjusting point.

Wherein the rotation angle of the turrets is calculated by the following formula: $Tr=(Tg-E)/et$; wherein Tr is a rotation angle required to rotate an adjusting knob from current position to an objective position, Tg is the objective adjusting quantity of the adjusting knob received by the central controlling portion, E is the current adjusting quantity of the adjusting knob and et is the unit adjusting quantity of the adjusting knob.

Wherein the central controlling portion can cooperate with at least one of the sensing portions to obtain the adjusting quantity of the adjusting knob corresponding to the angle position sensor.

Wherein the first transmission module can connect with other devices to receive the objective adjusting quantity of the adjusting knobs.

Wherein the transmitting portion includes a transmitting cap fixed to the corresponding adjusting knob and the first gear is formed on an outer edge of the transmitting cap.

Wherein the transmitting portion includes a transmitting ring fixed to the corresponding adjusting knob and the first gear is also formed on an outer edge of the transmitting ring.

Wherein the fixing portion includes an annular fixing frame fixed to the main body of the telescopic sight and provided with fixing holes for receiving the sensing portion and the driving portion therein.

Wherein the fixing portion includes an annular fixing ring fixed to the main body of the telescopic sight and provided with a protrusion engaged with the central controlling portion.

Wherein the setting portion includes a second transmission module, a setting program executed by the setting portion and a displaying module; during setting, the first transmission module is connected to the second transmission module and setting steps are displayed on the setting interface of the displaying module for setting up; and the setting data for the sensing portions is set on the central controlling portion via the setting steps so that the central controlling portion can calculate the instant adjusting quantity of the adjusting knob according to the setting data.

Wherein the setting steps include: setting the lowest point and the highest point within a certain adjusting range of the adjusting knob, inputting an adjusting value of the adjusting range, selecting an adjusting unit and setting a starting point within the adjusting range of the adjusting knob.

Wherein the setting steps include: setting a marked point on the adjusting scale of the adjusting knob as the N−1th point and reading out the scale value of the N−1th point; setting a adjusting scale marked point on the adjusting knob as the Nth point on and reading out the scale value of the Nth point; obtaining and storing all the adjusting scale marked points of the adjusting knob by the central controlling portion; setting the N−1th point of a adjusting scale as a starting point within a calculation range of the sensing portion and setting the Nth point of the adjusting scale as an end point within the calculation range of the sensing portion, wherein N is an integer greater than or equal to two.

The present disclosure provides the advantages as below.

The structure of the present disclosure can quickly convert the adjusting quantity of each adjusting knob of the telescopic sight from a physical value into a numeric value to be displayed on a screen so the shooter can obtained the adjusting value of adjusting knobs swiftly and automatically adjust the adjusting knob to a required position according to the objective adjusting quantity received from other smart devices, so that a target can be accurately and quickly hit without manual adjustment of the telescopic sight and the firing efficiency can be greatly improved.

BRIEF DESCRIPTION OF THE DRAWINGS

Many aspects of the embodiments can be better understood with reference to the following drawings. The components in the drawings are not necessarily dawns to scale, the emphasis instead being placed upon clearly illustrating the principles of the embodiments. Moreover, in the drawings, like reference numerals designate corresponding parts throughout the several views.

DETAILED DESCRIPTION

Figure 1:
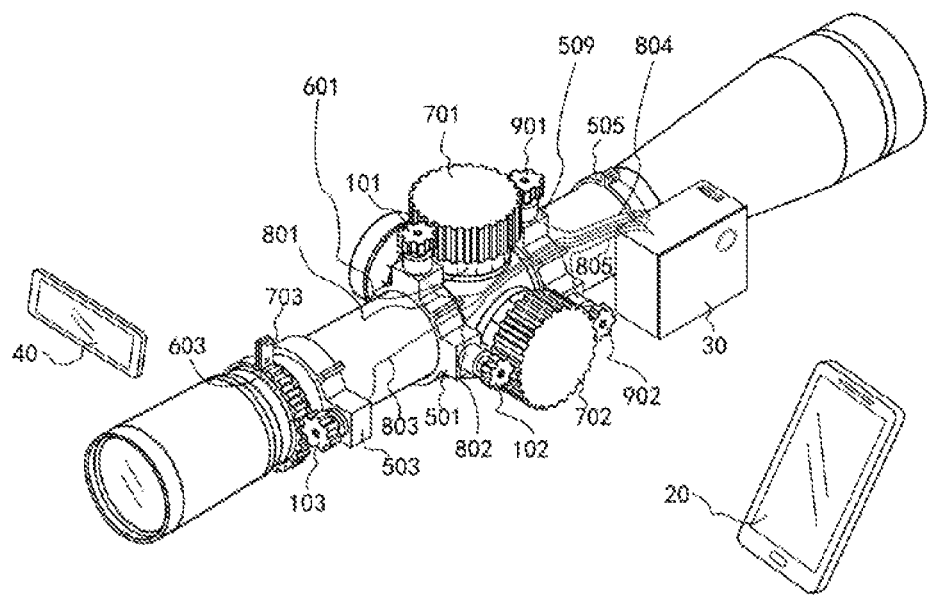
FIG. 1 is an assembly schematic view of the sensing and adjustment system and a telescopic sight in accordance with an exemplary embodiment.

The disclosure is illustrated by way of example and not by way of limitation in the figures of the accompanying drawings, in which like reference numerals indicate similar elements. According to the described exemplary embodiment of the present disclosure, all other embodiments obtained by one of ordinary skill in the related art without the need for a creative labor are within the protection scope of the present disclosure. Unless defined otherwise, the technical terms or scientific terms used for the present disclosure shall be a general meaning commonly understood by those having ordinary skill in the related art to which the present disclosure is applied.

In the description of the present disclosure, it needs to be understood that the terms mentioned below: "central", "longitudinal", "transverse", "length", "width", "thickness", "upper", "below", "front", "back", "left", "right", "vertical", "horizontal", "top", "bottom", "inner", "outer", "clockwise", "anticlockwise", etc, are shown in the specification of the present disclosure. The indicated orientation or position of the terms shown in the detailed description is based on the orientation or position shown in the figures of the accompanying drawings of the present disclosure, which is only to easily simplify the description of the present disclosure, but not indicated that the devices or elements of the present disclosure should have a particular orientation or should be designed and operated in a particular orientation. So the terms illustrated in the detail description are not by way of the limitation of the present disclosure.

In addition, the terms such as "first" and "second" shown in the specification are only used to describe, but not indicated that the elements of the present disclosure is important or represented the amount of the elements. That is, the features limited by the terms of "first" and "second" may explicitly or implicitly include one or more features. In the description of the present disclosure, the meaning of the term "a plurality of" is not less than two unless it is specifically illustrated.

In the present disclosure, except where specifically otherwise illustrated or limited, the terms "install", "connect", "link" and "fix" used herein should be understood in a broad perceive. Such as, the meaning may be tight connection, removable connection, or integrated connection. The meaning may also be mechanical connection, electrical connection, direct connection or indirect connection through intermediaries, or internal connection within two elements. The meaning of the terms used herein may be understood by one of ordinary skill in the related art according to specific conditions of the present disclosure.

Figure 2:
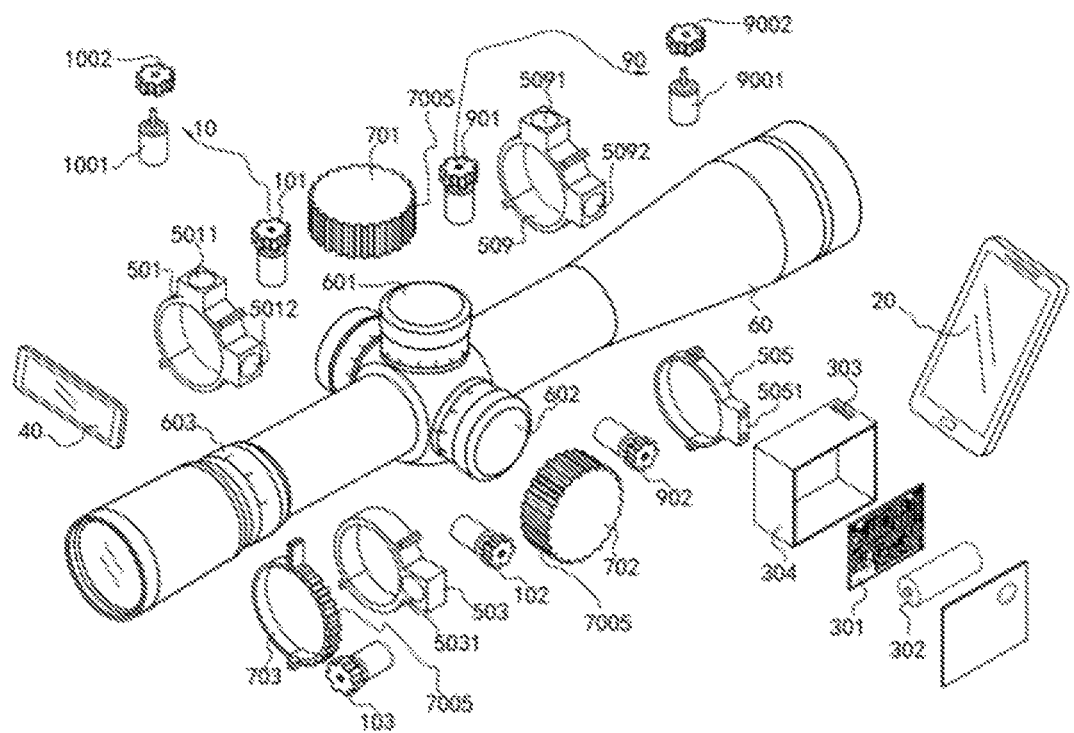
FIG. 2 is an exploded schematic view of the sensing and adjustment system and the telescopic sight of FIG. 1.

Referring to FIG. 1 and FIG. 2, a sensing and adjustment system used on a telescopic sight, the telescopic sight includes a plurality of adjusting knobs and a main body 60.

In an exemplary embodiment of the present disclosure, the plurality of adjusting knobs includes an elevation turret 601, a windage turret 602 and a magnification power ring 603.

Figure 3:
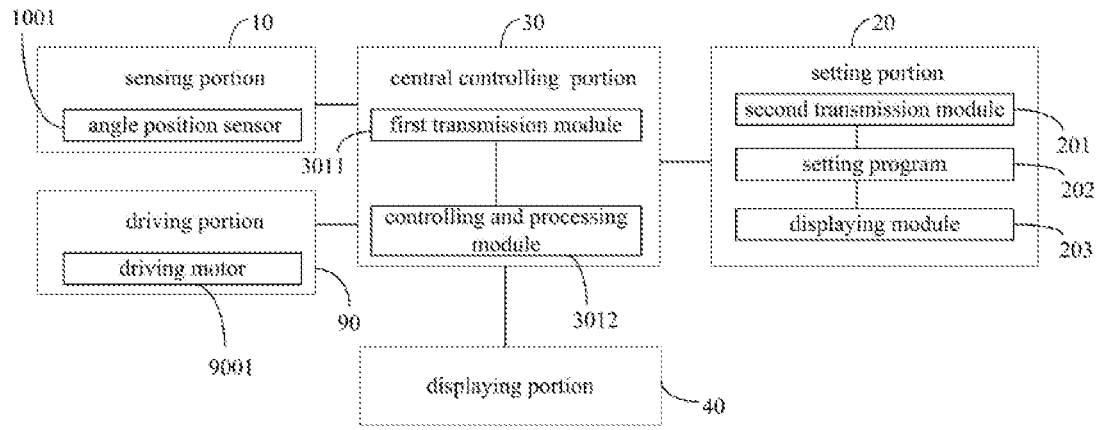
FIG. 3 is a module diagram view of a setting portion, a central controlling portion and a sensing portion of the sensing and adjustment system of FIG. 1.

Referring to FIGS. 1-3, the sensing and adjustment system is configured to perceive the adjusting quantity of the adjusting knobs of the telescopic sight and calculates the adjusting angle of the adjusting knobs, and simultaneously and automatically adjusts the adjusting knobs. The sensing and adjustment system includes a plurality of sensing portions 10, a plurality of driving portion 90, a setting portion 20, a central controlling portion 30, a displaying portion 40, a plurality of fixing portions (not labeled) and a plurality of transmitting portions (not labeled). Each transmitting portion includes a first transmitting cap 701, a second transmitting cap 702 and a transmitting ring 703 fixed respectively to a corresponding adjusting knob. Each transmitting portion also includes a first gear 7005. The fixing portion includes a first fixing frame 501, a second fixing frame 503, a third fixing frame 509 and a fixing ring 505 respectively fixed to the main body 60 of the telescopic sight. The first fixing frame 501 includes a first pair of fixing holes 5011, 5012, while the second fixing frame 503 also includes a fixing hole 5031 and the third fixing frame 509 includes a second pair of fixing holes 5091, 5092. The fixing holes 5011, 5012, 5031 are respectively provided for receiving a corresponding sensing portion 10 therein. The fixing holes 5091, 5092 are respectively provided for receiving a corresponding driving portion 90 therein. Each sensing portion 10 includes an angle position sensor 1001 and a second gear 1002 fixed to the first rotation shaft of the angle position sensor 1001 and meshed with a corresponding first gear 7005. The angle position sensor 1001 is configured to perceive a rotation angle of the corresponding adjusting knob and then transmit rotation angle data to a first transmission module 3011 via wires or wireless means. Each driving portion 90 is fixed to a corresponding fixing hole and includes a driving motor 9001 and a third gear 9002 fixed to a second rotation shaft of the driving motor 9001 and meshed with a corresponding first gear 7005. The driving motor 9001 is configured to drive a corresponding adjusting knob to rotate via the transmitting portion. The central controlling portion 30 is fixed to the fixing ring 505 and includes the first transmission module 3011 and a controlling and processing module 3012. The first transmission module 3011 is configured to receive the rotation angle data and then transmitted it to the controlling and processing module 3012. The setting portion 20 is connected to the central controlling portion 30 and configured to set setting data for the sensing portion 10 and transmit the setting data to the central controlling portion 30. The displaying portion 40 is connected to the central controlling portion 30. The controlling and processing module 3012 is configured to calculate a current adjusting quantity of the adjusting knob according to the setting data and the rotation angle data of the adjusting knob so as to convert the adjusting quantity of the adjusting knob from a physical value into a numeric value, and the central controlling portion 30 is then transmitted the numeric adjusting value of the adjusting knob to the displaying portion 40 or/and other devices. The first transmission module 3011 can connect with other devices to receive an objective adjusting quantity for the adjusting knob. In the present disclosure, the objective adjusting quantity is the adjusting quantity for the corresponding adjusting knob of a specific telescopic sight input from other devices or calculated by other smart devices in order to accurately hit a specific target. The controlling and processing module 3012 is configured to apply a driving voltage to the driving motor 9001 of the corresponding driving portion 90 according to the objective adjusting value received for the corresponding adjusting knob, and drive the corresponding adjusting knob to rotate via the transmitting portion and automatically adjust the corresponding adjusting knob to an objective position shown on a corresponding adjusting scale.

In an exemplary embodiment of the present disclosure, the angle position sensor 1001 is an encoder or a potentiometer or a rotary position sensor.

In an exemplary embodiment of the present disclosure, the potentiometer is also known as an adjustable variable resistor which is configured to adjust the resistance linearly by rotating the rotating shaft so that the resistance is linear to the rotating angle of the rotating shaft. A unit resistance of the potentiometer can be measured by the following formula: $Y=\Delta R/\Delta A$; wherein $\Delta R$ is a resistance increment while rotating the rotating shaft, and $\Delta A$ is an angle increment while rotating the rotating shaft. In this way, a resistance change of the potentiometer $\Delta r$ divided by its unit resistance Y of the potentiometer, then the angle change of the rotating shaft $\Delta a$ can be obtained. That is, $\Delta a=\Delta r/Y$. So, the resistance perceived can be converted to the angle value, thereby the potentiometer can also be used as an angle position sensor.

In an exemplary embodiment of the present disclosure, the setting portion 20 is a portable terminal device, such as a mobile phone or a computer, etc., that programs can be installed and executed therein.

The adjusting quantity of each adjusting knob can be swiftly calculated into numeric value by the controlling and processing module 3012 and timely displayed on the displaying portion 40 so that the shooter can quickly see the instant adjusting quantity of each adjusting knob through the displaying portion 40 while aiming at the target, thereby the shooting efficiency is greatly improved.

The sensing and adjustment system of the present disclosure can not only perceive the instant adjusting quantity of each adjusting knob of the telescopic sight, but also connect with other smart devices, thereby it can automatically adjust the adjusting knobs of the telescopic sight to their objective position according to calculation results of other smart devices. In this way, a target can be swiftly and accurately hit without manual adjustment on the telescopic sight to greatly improve the shooting efficiency.

In an exemplary embodiment of the present disclosure, the plurality of sensing portions 10 includes a first sensing portion 101, a second sensing portion 102 and a third sensing portion 103. The plurality of driving portion 90 includes a first driving portion 901 and a second driving portion 902. The plurality of transmitting portions includes the first transmitting cap 701 for the elevation turret 601, the second transmitting cap 702 for the windage turret 602 and the transmitting ring 703 for the magnification power ring 603, all of them respectively fixed to a corresponding adjusting knob. The plurality of fixing portions includes the first fixing frame 501, the second fixing frame 503, the third fixing frame 509 and the fixing ring 505, each fixed to the main body 60 of the telescopic sight. The first sensing portion 101 is fixed to the first fixing frame 501 via the fixing hole 5011 and its second gear 1002 is meshed with the first gear 7005 of the first transmitting cap 701 for the elevation turret 601, the second sensing portion 102 is also fixed to the first fixing frame 501 via the fixing hole 5012 and its second gear 1002 is meshed with the first gear 7005 of the second transmitting cap 702 for the windage turret 602, and the third sensing portion 103 is fixed to the second fixing frame 503 via the fixing hole 5031 and its second gear 1002 is meshed with the first gear 7005 of the transmitting ring 703 for the magnification power ring 603. The first driving portion 901 is fixed to the third fixing frame 509 via the fixing hole 5091 and its third gear 9002 is meshed with the first gear 7005 of the first transmitting cap 701 for the windage turret 601, and the second driving portion 902 is also fixed to the third fixing frame 509 via the fixing hole 5092 and its third gear 9002 is meshed with the first gear 7005 of the second transmitting cap 702 for the windage turret 602. The central controlling portion 30 is fixed to the main body 60 of the telescopic sight via the fixing ring 505, and all of the first, second and third sensing portions 101, 102, 103 are connected to the central controlling portion 30 via their corresponding wires 801, 802, 803. The first and second driving portions 901, 902 are connected to the central controlling portion 30 via their corresponding wires 804, 805.

In an exemplary embodiment of the present disclosure, the sensing portion 10 includes the angle position sensor 1001 configured to perceive the rotation angle of the corresponding adjusting knob via the second gear 1002 and the corresponding first gear 7005 and then transmit the rotation angle data to the central controlling portion 30. In this way, the central controlling portion 30 is configured to calculate the instant adjusting quantity of the adjusting knob according to the setting data of the setting portion 20 and the rotation angle data of the sensing portion 10.

Furthermore, the current adjusting quantity of the adjusting knob is calculated by the following formula: $E=et*X+S$; wherein E is the current adjusting quantity of the adjusting knob, et is a unit adjusting quantity of the adjusting knob, S is a reference value, and X is the rotation angle of the adjusting knob perceived by the sensing portion 10.

Wherein the unit adjusting quantity of the adjusting knob is calculated by the following formula: $et=e/a$; wherein a is the rotation angle of the adjusting knob perceived by the sensing portion 10 when the adjusting knob is rotated from one adjusting point to another adjusting point, and e is an adjusting range quantity between the two adjusting points read on adjusting scale marks of the adjusting knob.

In an exemplary embodiment of the present disclosure, the reference value is: a certain point between one adjusting point M and the another adjusting point N set as a reference point L, the adjusting quantity of the adjusting knob on the reference point L is taken as a reference value by the central controlling portion 30 to calculate the adjusting quantity of the adjusting knob positioned between the one adjusting point M and the another adjusting point N, and the reference value is the reference quantity between the one adjusting point M and the another adjusting point N.

Referring to FIGS. 1-3, specifically, when the adjusting knobs 601, 602, 603 are respectively moved from the one adjusting point to the another adjusting point, each of their rotation angle a1, a2, a3 respectively perceived by the corresponding first, second and third sensing portions 101, 102, 103 is a corresponding rotation angle of the adjusting knobs 601, 602, 603. In this way, the adjusting range quantities e1, e2, e3 between the two adjusting points read on the adjusting scale of the corresponding adjusting knobs 601, 602, 603 divided by their corresponding rotation angles a1, a2, a3, then their respective unit adjusting quantities et1, et2, et3 of the corresponding adjusting knobs can be obtained. That is, $et1=e1/a1$, $et2=e2/a2$, $et3=e3/a3$, i.e., the et1, et2, et3 are respectively the unit adjusting quantity of the adjusting knobs 601, 602, 603 corresponding to the first, second and third sensing portions 101, 102, 103.

In the process of respectively rotating the adjusting knobs 601, 602, 603 from the one adjusting point to the another adjusting point, the angle rotated respectively perceived by the corresponding sensing portions 101, 102, 103 are also changing accordingly. By means of the setting portion 20, a certain point of the adjusting knobs 601, 602, 603 during their respective rotation processes is set respectively as a reference point, and each adjusting quantity read from the adjusting scale of the adjusting knobs 601, 602, 603 on their respective reference points is set as their respective reference values S1, S2, S3. At the same time, one direction of their respective rotations of the adjusting knobs 601, 602, 603 is respectively set as an increase of the adjusting quantity of the corresponding adjusting knob and the other rotation direction is set as a decrease of the adjusting quantity of the same adjusting knob. When the adjusting knobs 601, 602, 603 rotates respectively an angle X1, X2, X3 from their respective reference point, respectively, by means of the central controlling portion 30, the angles X1, X2, X3 respectively perceived by the corresponding sensing portions 101, 102, 103 is multiplied by the corresponding unit adjusting quantities et1, et2, et3 of their respective adjusting knobs 601, 602, 603 between their respective two adjustment points, and then adds or subtracts the corresponding reference values S1, S2, S3, thereby their respective numeric instant adjusting quantity E1, E2, E3 of the corresponding adjusting knobs 601, 602, 603 is obtained. That is, $E1=et1*X1+S1$, $E2=et2*X2+S2$, $E3=et3*X3+S3$.

Furthermore, the central controlling portion 30 can separately connect with any of the first, second and third sensing portions 101, 102, 103 to obtain the adjusting quantity of their respective adjusting knobs corresponding to the first, second and third sensing portions 101, 102, 103, or can connect with more or all of the first, second and third sensing portions 101, 102, 103 to obtain the adjusting quantity of the adjusting knob located in their respective first, second and third sensing portions 101, 102, 103. That is to say, the central controlling portion 30 can connect with at least one sensing portion 10 to obtain the adjusting quantity of the adjusting knob corresponding to the sensing portion 10.

Referring to FIG. 1 and FIG. 2, the transmitting portion includes the first transmitting cap 701, the second transmitting cap 702 and the transmitting ring 703. The first and second transmitting caps 701, 702 are circular-cap-structure and respectively fixed to their corresponding adjusting knobs, and the transmitting ring 703 is an annular fixing ring structure and fixed to the corresponding adjusting knob. The first gear 7005 is respectively formed on an outer edge of each of the first transmitting cap 701, the second transmitting cap 702 and the transmitting ring 703 and meshed with a corresponding second gear 1002.

Referring to FIG. 1 and FIG. 2, the fixing portion includes the first fixing frame 501, the second fixing frame 503, the third fixing frame 509 and the fixing ring 505. Each of the first fixing frame 501, the second fixing frame 503, the third fixing frame 509 and the fixing ring 505 includes an annular fixing part (not labeled) fixed to the main body 60 of the telescopic sight. The fixing ring 505 includes a protrusion 5009 engaged with the central controlling portion 30.

Referring to FIG. 3, the setting portion 20 includes a second transmission module 201, a setting program 202 executed by the setting portion 20 and a displaying module 203. During setting, the first transmission module 3011 of the central controlling portion 30 is connected to the second transmission module 201 and a plurality of setting steps are set on a setting interface of the displaying module 203. Setting data for the sensing portion 10 is set on the central controlling portion 30 via the setting steps so that the central controlling portion 30 can calculate the current adjusting quantity of the adjusting knob according to the setting data.

In an exemplary embodiment of the present disclosure, the setting data includes starting angle data vB, terminating angle data vE, reference angle data vR, angle data vX, the reference value S, the adjusting unit of the sensing portion 10, and the unit adjusting quantity et of the sensing portion 10 between a starting point of a calculation range and an end point of the calculation range.

The setting portion 20 can respectively set the setting data of the first, second and third sensing portions 101, 102, 103 by the setting steps of the setting program 202 and then the setting data can be transmitted to the central controlling portion 30 via the second transmission module 201. The central controlling portion 30 can store the setting data after the setting process is completed so that the central controlling portion 30 can also normally work after the setting portion 20 is disconnected.

Figure 4:
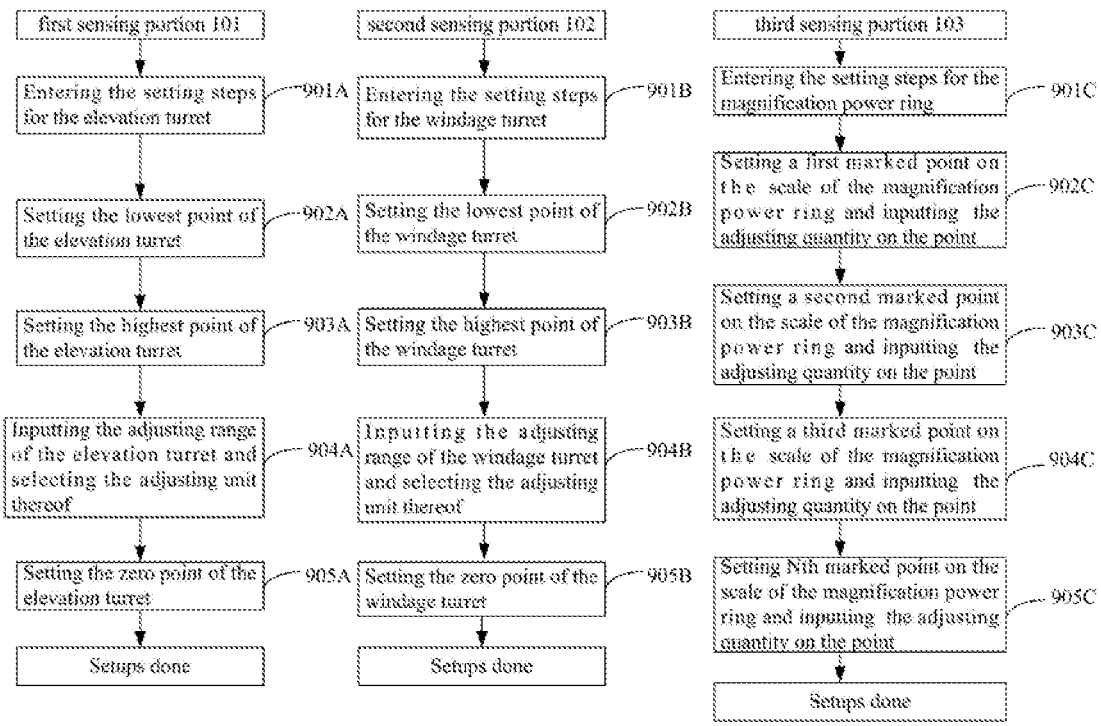
FIG. 4 is a setting process diagram view of the setting portion of the sensing and adjustment system of FIG. 1.

Specifically, referring to FIG. 4, when a setting up is needed, the setting portion 20, the central controlling portion 30 and the sensing portion 10 are connected to each other. Then, turn on all power switches, first select the first sensing portion 101 on the setting interface to begin with the setting steps for the first sensing portion 101, as shown in step 901A. After finishing the step 901A and then proceed to the step 902A. In the step 902A, the action of turning the elevation turret 601 to its lowest point is prompted on the setting interface. When the action is completed and click to confirm on the setting interface, a starting point of the calculation range of the first sensing portion 101 is thus obtained and stored in the central controlling portion 30, which is the starting angle data vB perceived by the first sensing portion 101. After finishing the step 902A and then entering the next step 903A by clicking the setting interface. In the step 903A, the action of turning the elevation turret 601 to its highest point is prompted on the setting interface. An end point of the calculation range of the first sensing portion 101 is thus obtained and stored in the central controlling portion 30, which is the terminating angle data vE perceived by the first sensing portion 101. After finishing the step 903A and then entering the next step 904A by clicking the setting interface. In the step 904A, the action of inserting the value of adjusting range e1 of the elevation turret 601 is prompted on the setting interface, that is, the adjusting range e1 is a total adjusting quantity between the lowest point and the highest point read on the scale of the elevation turret 601. And the action of selecting the unit of the adjusting range to be MRAD (Mildot) or MOA is also prompted by the setting interface, thereby the adjusting unit of the first sensing portion 101 is obtained and stored in the central controlling portion 30. When all the steps 902A, 903A, 904A are finished, the central controlling portion 30 can also configured to obtain a rotation angle a1 (a1=vE−vB) between the starting point and the end point within the calculation range of the first sensing portion 101, and the adjusting range e1 can be read from the scale between the starting point and the end point within the calculation range of the elevation turret 601. In this way, the unit adjusting quantity et1 of the first sensing portion 101 between the starting point and the end point of the calculation range can be obtained, that is, et1=e1/a1. When this step above is finished, another next step 905A can be entered by clicking the setting interface. In the step 905A, the action of turning the elevation turret 601 to its zero point is prompted on the setting interface, the zero point is when the elevation turret and the windage turret of a sight is respectively adjusted to a point so the point of aim (POA) is coincide with the point of impact (POI). At this setting step, the zero point of the elevation turret 601 is taken as a reference point, which is the reference angle data vR perceived by the first sensing portion 101. In practice, the adjusting quantity of a zero point is set as 0. In this way, the reference value S1 of the elevation turret 601 at the reference point is automatically set as 0 by the central controlling portion 30 so that action of inserting the reference value is not required here. Thus, the setting up process of the first sensing portion 101 is completed by clicking the setting interface. When all of the setting steps are completed, the central controlling portion 30 can obtain and store the starting angle data vB of the first sensing portion 101, the terminating angle data vE, the unit adjusting quantity et1 of the first sensing portion 101 between the starting point and the end point within the calculation range, the reference angle data vR and the reference value S1. Also, the central controlling portion 30 can obtain the angle data vX of the first sensing portion 101 when the elevation turret 601 is adjusted. That is, the rotation angle X1 of first sensing portion 101 relative to the reference point can be obtained from the formula: X1=vX−vR. So, an instant adjusting value E1 of the elevation turret 601 can be calculated by the central controlling portion 30 from the formula: E1=et1*X1+S1.

Referring to FIG. 4, the setting steps for the second sensing portion 102 corresponding to the windage turret 602 are same as the setting steps of the first sensing portion 101 corresponding to the elevation turret 601. At this time, first select the second sensing portion 102 on the setting interface to begin with the setting steps for the second sensing portion 102, as shown in step 901B. After finishing the step 901B and then entering the next step 902B. In the step 902B, the action of turning the windage turret 602 to its lowest point is prompted on the setting interface. A starting point of the calculation range of the second sensing portion 102 is thus obtained and stored in the central controlling portion 30, which is the starting angle data vB perceived by the second sensing portion 102. After that, entering the next step 903B, the action of turning the windage turret 602 to its highest point is prompted on the setting interface. An end point of the calculation range of the second sensing portion 102 is thus obtained and stored in the central controlling portion 30, which is the terminating angle data vE perceived by the second sensing portion 102. And then entering the next step 904B, the action of inserting the value of adjusting range e2 of the windage turret 602 and the action of selecting the unit of the adjusting range to be MRAD (Mildot) or MOA is prompted on the setting interface. When all the steps 902B, 903B, 904B are finished, the central controlling portion 30 can also configured to obtain a rotation angle a2 between the starting point and the end point within the calculation range of the second sensing portion 102, and the adjusting range e2 can be read from the adjusting scale between the starting point and the end point of the windage turret 602. In this way, the unit adjusting quantity et2 of the second sensing portion 102 between the starting point and the end point can be obtained, that is, et2=e2/a2. Finally, entering another next step 905B, the action of turning the windage turret 602 to its zero point is prompted by the setting interface, after completing the action a reference value S2 of the windage turret 602 at its reference point is automatically set to zero by the central controlling portion 30. After that, the setting up process of the second sensing portion 102 is completed by clicking the setting interface. When the step 905B is completed, the central controlling portion 30 can obtain and store the unit adjusting quantity et2 of the second sensing portion 102 between the starting point and the end point within the calculation range, and the reference value S2. Also, the central controlling portion 30 can obtain the rotation angle X2 relative to the reference point of the second sensing portion 102 when the windage turret 602 is adjusted. So, an instant adjusting value E2 of the windage turret 602 can be calculated by the central controlling portion 30 from the formula: E2=et2*X2+S2.

Specifically, referring to FIG. 4, when a setting up is needed for the third sensing portion 103 corresponding to the magnification power ring 603, first select the third sensing portion 103 on the setting interface to begin with the setting steps for the third sensing portion 103, as shown in step 901C. After finishing the step 901C and then entering the next step 902C. In the step 902C, the action of turning the magnification power ring 603 to its first marked point on the power adjusting scale and the action of input the adjusting quantity of the first marked point read from the power adjusting scale is prompted by the setting interface. The first point of its calculation range of the third sensing portion 103 is thus obtained and stored in the central controlling portion 30, which is a first angle data v1 perceived by the third sensing portion 103 and the first adjusting quantity p1 of the first point within the calculation range. After finishing the step 902C and then entering the next step 903C by clicking the setting interface. In the step 903C, the action of turning the magnification power ring 603 to its second marked point on the power adjusting scale and the action of input the adjusting quantity of the second marked point read from the power adjusting scale is prompted by the setting interface. The second point of the calculation range of the third sensing portion 103 is thus obtained and stored in the central controlling portion 30, which is a second angle data v2 perceived by the third sensing portion 103 and the second adjusting quantity p2 of the second point within the calculation range. After finishing the step 903C and then entering the next step 904C by clicking the setting interface. In the step 904C, the action of turning the magnification power ring 603 to its third marked point on the power adjusting scale and the action of input the adjusting quantity of the third marked point read from the power adjusting scale is prompted by the setting interface. The third point within the calculation range of the third sensing portion 103 is thus obtained and stored in the central controlling portion 30, which is a third angle data v3 perceived by the third sensing portion 103 and the third adjusting quantity p3 of the third point within the calculation range. And so on, until the setting action reaches the last marked point on the power adjusting scale of the magnification power ring 603, the last marked point is set as the Nth marked point. As in the step 905C, the action of turning the magnification power ring 603 to its Nth marked point on the power adjusting scale and the action of input the adjusting quantity of the Nth marked point read from the power adjusting scale is prompted by the setting interface. The Nth point within the calculation range of the third sensing portion 103 is thus obtained and stored by the central controlling portion 30, which is a Nth angle data vN perceived by the third sensing portion 103 and the Nth adjusting quantity pN of the Nth point of the calculation range. Between the first and second marked points on the power adjusting scale of the magnification adjusting knob 603, the first marked point is regarded as the starting point of the first calculation range of the third sensing portion 103, then the starting angle data vB=v1. At the same time, the second marked point is regarded as the end point of the first calculation range of the third sensing portion 103, then the end angle data vE=v2. After that, the central controlling portion 30 can also configured to obtain a rotation angle a3(1) (a3(1)=vE−vB=v2−v1) between the starting point and the end point within the first calculation range of the magnification power ring 603, and the adjusting range e3(1) (e3(1)=p2−p1) read on the scale between the starting point and the end point within the first calculation range of the magnification power ring 603. In this way, the unit adjusting quantity et3(1) of the third sensing portion 103 between the starting point and the end point within the first calculating range can be obtained, that is, et3(1)=e3(1)/a3(1). Furthermore, the first marked point on the adjusting scale of the magnification power ring 603 was regarded as the reference point, then the reference angle data vR(1)=v1, the reference value S3(1)=p1. Finally, the central controlling portion 30 can obtain the angle data vX(1) perceived by the third sensing portion 103 when the magnification power ring 603 is adjusted between the first and second marked points on its adjusting scale. That is, the rotation angle X3(1) of the magnification power ring 603 relative to the reference point can be obtained from the formula: X3(1)=vX(1)−vR(1). So, an instant adjusting quantity E3(1) between the first and second marked points of the scale of the magnification power ring 603 can be calculated by the central controlling portion 30 from the formula: E3(1)=et3(1)*X3(1)+S3(1). In the same manner, between the second point and the third marked point on the adjusting scale of the magnification power ring 603, the second marked point is regarded as the starting point within the second calculation range of the third sensing portion 103, then the starting angle data vB=v2. At the same time, the third marked point is regarded as the end point within the second calculation range of the third sensing portion 103, then the end angle data vE=v3. After that, the central controlling portion 30 can also configured to obtain the rotation angle a3(2) (a3(2)=vE−vB=v3−v2) between the starting point and the end point within the second calculation range of the magnification power ring 603, and the adjusting range e3(2) (e3(2)=p3−p2) read on the adjusting scale between the starting point and the end point of the second calculation range of the magnification power ring 603. In this way, the unit adjusting quantity et3(2) of the third sensing portion 103 between the starting point and the end point of the second calculating range can be obtained, that is, et3(2)=e3(2)/a3(2). Furthermore, the second marked point on the adjusting scale of the magnification power ring 603 was regarded as the reference point, then the reference angle data vR(2)=v2, the reference value S3(2)=p2. Finally, the central controlling portion 30 can obtain the angle data vX(2) perceived by the third sensing portion 103 when the magnification power ring 603 is adjusted between the second point and the third point on the adjusting scale. That is, the rotation angle X3(2) of the magnification power ring 603 relative to the reference point can be obtained from the formula: X3(2)=vX(2)−vR(2). So, an instant adjusting quantity E3(2) between the second and third marked points of the scale of the magnification power ring 603 can be calculated by the central controlling portion 30 from the formula: E3(2)=et3(2)*X3(2)+S3(2). The rest may be inferred to the Nth point. Between the N−1th marked point and the Nth marked point on the adjusting scale of the magnification power ring 603, the N−1th marked point is regarded as the starting point within the N−1th calculation range of the third sensing portion 103, then the starting angle data vB=v(N−1). At the same time, the Nth point is regarded as the end point of the N−1th calculation range of the third sensing portion 103, then the end angle data vE=vN. After that, the central controlling portion 30 can also configured to obtain the rotation angle a3(N−1) (a3(N−1)=vE−vB=vN−v(N−1)) between the starting point and the end point within the N−1th calculation range of the magnification power ring 603, and the adjusting range e3(N−1) (e3(N−1)=pN−p(N−1)) read from adjusting scale between the starting point and the end point within the N−1th calculation range of the magnification adjusting knob 603. In this way, the unit adjusting quantity et3(N−1) of the third sensing portion 103 between the starting point and the end point within the N−1th calculating range can be obtained, that is, et3(N−1)=e3(N−1)/a3(N−1). Furthermore, the N−1th point on the adjusting scale of the magnification power ring 603 was regarded as the reference point, then the reference angle data vR(n−1)=v(n−1), the reference value S3(n−1)=p(N−1). Finally, the central controlling portion 30 can obtain the angle data vX(N−1) perceived by the third sensing portion 103 when the magnification adjusting knob 603 is adjusted between the N−1th point and the Nth point on the adjusting scale. That is, the rotation angle X3(N−1) of the magnification power ring 603 relative to the reference point can be obtained from the formula: X3(N−1)=vX(N−1)−vR(N−1). So, an instant adjusting quantity E3(N−1) between the N−1th and the Nth marked points of the adjusting scale of the magnification power ring 603 can be calculated by the central controlling portion 30 from the formula: E3(N−1)=et3(N−1)*X3(N−1)+S3(N−1).

Figure 5:
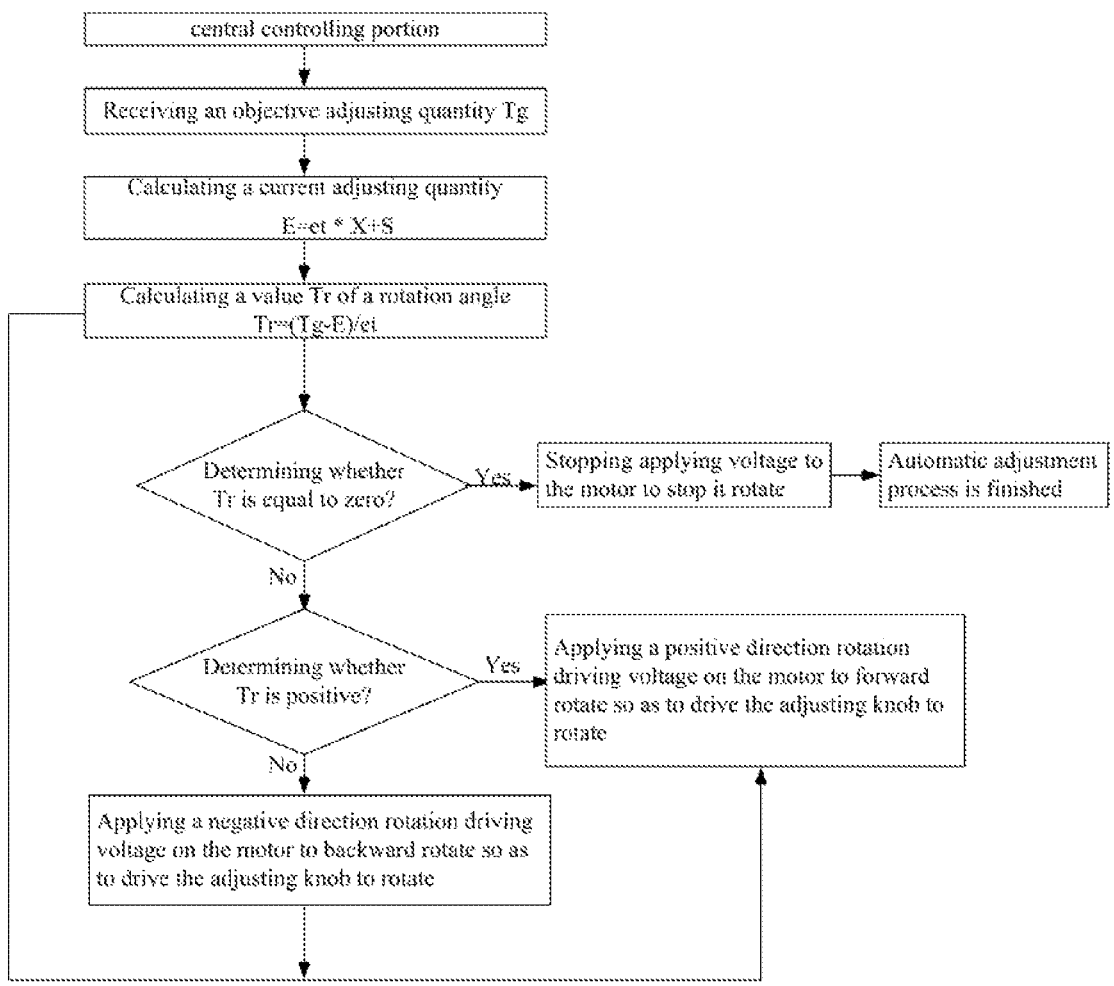
FIG. 5 is a process diagram view of the central controlling portion of the sensing and adjustment system of FIG. 1.

In an exemplary embodiment of the present disclosure, referring to FIG. 1, FIG. 2 and FIG. 5, the first transmission module 3011 can be connected with other devices to receive an objective adjusting quantity for the adjusting knob. When all setting steps are completed, the controlling and processing module 3012 can calculate the adjusting angle needed to adjust the adjusting knob according to the objective adjusting quantity received for the adjusting knobs, the current adjusting quantity of the adjusting knob and the unit adjusting quantity of the adjusting knob, and simultaneously apply a continuous driving voltage to the driving motor 9001 of the corresponding driving portion 90 to automatically adjust the adjusting angle of the adjusting knob. Specifically, a driving voltage is applied on the driving motor 9001 of a corresponding driving portion 90 by the central controlling portion 30 so that the driving motor 9001 drives the third gear 9002 to rotate so that the first gear 7005 meshed with the third gear 9002 is driven to rotate, and then the adjusting knob is driven to rotate a certain angle by the first gear 7005 of the transmitting portion, finally the corresponding adjusting knob is automatically adjusted to an objective position shown on the corresponding adjusting scale. The rotation angle of the adjusting knob is calculated by the following formula: Tr(Tg−E)/et; wherein Tr is a rotation angle required for the adjusting knob, Tg is the objective adjusting quantity received for the adjusting knob, E is the current adjusting quantity of the adjusting knob and et is the unit adjusting quantity of the corresponding adjusting knob stored in the central controlling portion 30 after the setting steps are finished.

Referring to FIG. 5, the objective adjusting quantity is the adjusting quantity for the corresponding adjusting knob of a specific telescopic sight received from other devices in order to accurately hit a specific target. In an exemplary embodiment of the present disclosure, it can be a set of numeric quantities manually input from other devices or calculated by other smart devices. For example, when the setting up process is finished, the current adjusting quantity of the elevation turret 601 of the telescopic sight is −5 MOA, and the current adjusting quantity of the windage 602 is 8 MOA. At this time, the sensing and adjustment system of the present disclosure receives a set of objective adjusting quantities: the elevation turret 601: 7 MOA, the windage turret 602: −3 MOA. Under this condition, the central controlling portion 30 can calculate that the value Tr of the adjusting angle of the elevation turret 601 is a positive number according to the above formula, and then the central controlling portion 30 can rotate the elevation turret 601 forward by applying a positive direction rotation driving voltage on the driving motor 9001 of the first driving portion 901 through the wire 804, thereby the elevation turret 601 is driven to rotate. During the rotation, the central controlling portion 30 can synchronously perceive an instant adjusting quantity of the elevation turret 601 through the angle position sensor 1001 of the first sensing portion 101. When the value Tr of the adjusting angle is positive, the central controlling portion 30 continuously applies the positive direction rotation driving voltage to the driving motor 9001 of the first driving portion 901 through the wire 804, until the value Tr of the adjusting angle of the elevation turret 601 is zero. At this time, the central controlling portion 30 cuts off the driving voltage so that the adjustment of the elevation turret 601 is automatically finished. Similarly, the central controlling portion 30 can calculate that the value Tr of the adjusting angle of windage turret 602 is negative according to the above formula, and then the central controlling portion 30 can drive the windage turret 602 rotate by applying a negative direction rotation driving voltage on the driving motor 9001 of the second driving portion 902 of the second sensing portion 102 through the wire 805, thereby the windage turret 602 is driven to rotate. During rotation, the central controlling portion 30 can synchronously perceive an instant adjusting quantity of the windage turret 602 through the angle position sensor 1001 of the second sensing portion 102. When the value Tr of the adjusting angle is negative, the central controlling portion 30 continuously applies the negative direction rotation driving voltage to the driving motor 9001 of the driving portion 902 through the wire 805, until the value Tr of the adjusting angle of the windage turret 602 is zero. At this time, the central controlling portion 30 cuts off the driving voltage so that the adjustment process of the windage turret 602 is automatically finished. After all the adjustment completed, the instant adjusting quantity of the high and elevation turret is 7 MOA, the instant adjusting quantity of the windage turret is −3 MOA, and the automatic adjustment process is finished.

In an exemplary embodiment of the present disclosure, the setting portion 20 can be connected to the central controlling portion 30 through means of wires or wireless connection.

Referring to FIG. 2, in an exemplary embodiment of the present disclosure, the central controlling portion 30 includes a main controlling circuit board 301, a main controlling power 302, a second external socket 303 and a main case 304. The main controlling circuit board 301, the main controlling power 302 and the second external socket 303 are all received in the main case 304. Both the first transmission module 3011 and the controlling and processing module 3012 are formed inside of the main controlling circuit board 301.

The sensing and adjustment system of the present disclosure, the adjusting quantity of each adjusting knob of the telescopic sight can be convert into a numeric value by the central controlling portion 30, the sensing portion 10 and the setting portion 20. That is, the calculation result of other smart shooting devices can be directly connected to the telescopic sight. The sensing and adjustment system of the present disclosure can make possible for the invention of new smart devices, such as the smart rangefinder with ballistic calculation function and the rapid adjustment of the telescopic sight, so that a novice shooter can shoot like or even surpass an experienced shooter. Also, low-end telescopic sights can also be used to obtain the functions of a high-end telescopic sights, such as a zero stop function which stop the elevation turret from rotating when it reaches zero point and Smart Range Turret function which allow the shooter to see the POA coincide with POI distance when the elevation turret is turned.

Furthermore, the sensing and adjustment system of the present disclosure can automatically adjust the adjusting knobs to the position of the objective adjusting quantity. In use, a shooter does not need to remove his eye sight from the aiming target to adjust the adjusting knobs, the firing efficiency of the weapons can be greatly improved.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A sensing and adjustment system used on a telescopic sight, the telescopic sight comprising a plurality of adjusting knobs and a main body, the sensing and adjustment system comprising: a plurality of sensing portions, a plurality of driving portions, a setting portion, a central controlling portion, a displaying portion, a plurality of fixing portions, and a plurality of transmitting portions;

each of the transmitting portions is fixed to a corresponding adjusting knob and comprises a first gear;

each of the sensing portions comprises an angle position sensor and a second gear fixed to a first rotation shaft of the angle position sensor and meshed with a corresponding first gear, the angle position sensor configured to perceive a rotation angle of the second gear and drive the second gear to rotate; each angle position sensor fixed to the main body of the telescopic sight near the corresponding adjusting knob and perceived a rotation angle of the corresponding adjusting knob via the transmitting portion and then transmitted the rotation angle data to the central controlling portion;

the driving portion comprises a driving motor and a third gear fixed to a second rotation shaft of the driving motor and meshed with a corresponding first gear, the driving motor configured to drive the third gear to rotate; each driving motor fixed to the main body of the telescopic sight near the corresponding adjusting knob; the central controlling portion configured to apply a driving voltage to the driving motor of the corresponding driving portion and drive the corresponding adjusting knob to rotate via the third gear and the first gear;

each of the fixing portions configured to fix the corresponding sensing portion, the corresponding driving portion and the central controlling portion to the main body of the telescopic sight;

the central controlling portion comprises a first transmission module and a controlling and processing module;

the setting portion connected to the central controlling portion and configured to set setting data of the sensing portions and then transmit the setting data to the central controlling portion;

the displaying portion connected to the central controlling portion; and wherein the controlling and processing module is configured to calculate a current adjusting quantity of the adjusting knob according to the setting data and the rotation angle data of the adjusting knob so as to convert the adjusting quantity of the adjusting knob from a physical value into a numeric value, and the central controlling portion is then configured to transmit the numeric adjusting quantity of the adjusting knobs to the displaying portion or/and other devices; and the controlling and processing module is configured to calculate an adjusting angle of the adjusting knob according to the current adjusting quantity of the adjusting knob and an objective adjusting quantity received for the adjusting knob and simultaneously apply a driving voltage to the driving motor of the corresponding driving portion to automatically adjust the adjusting angle of the adjusting knob.

2. The sensing and adjustment system as claimed in claim 1, wherein the current adjusting quantity of the adjusting knob is calculated by the following formula:

$E=et*X+S$; wherein

E is the current adjusting quantity of the adjusting knob, et is an unit adjusting quantity of the adjusting knob, S is a reference value, and X is the rotation angle of the adjusting knob perceived by the sensing portion; and wherein the unit adjusting quantity et of the adjusting knob is calculated by the following formula: $et=e/a$; wherein a is the rotation angle of the adjusting knob perceived by the sensing portion when the adjusting knob is rotated from one adjusting point to another adjusting point, and e is an adjusting range between the two adjusting points read from the adjusting scale of the adjusting knob.

3. The sensing and adjustment system as claimed in claim 2, wherein the reference value is: a certain point between the one adjusting point and the another adjusting point set as a reference point, the adjusting quantity of the adjusting knob positioned on the reference point is taken as a reference quantity by the central controlling portion to calculate the adjusting quantity of the adjusting knob positioned between the one adjusting point and the another adjusting point, and the reference quantity is the reference value between the one adjusting point and the another adjusting point.

4. The sensing and adjustment system as claimed in claim 2, wherein the rotation angle of the adjusting knob is calculated by the following formula: $Tr=(Tg-E)/et$; wherein Tr is a rotation angle required for the adjusting knob, Tg is the objective adjusting quantity received for the adjusting knob, E is the current adjusting quantity of the adjusting knob and et is the unit adjusting quantity of the adjusting knob.

5. The sensing and adjustment system as claimed in claim 1, wherein the central controlling portion is cooperable with at least one of the sensing portions to obtain the adjusting quantity of the adjusting knob corresponding to the angle position sensor.

6. The sensing and adjustment system as claimed in claim 1, wherein the first transmission module is connectable with other devices to receive the objective adjusting quantity for the adjusting knobs.

7. The sensing and adjustment system as claimed in claim 1, wherein the transmitting portion comprises a transmitting cap fixed to the corresponding adjusting knob and the first gear is formed on an outer edge of the transmitting cap.

8. The sensing and adjustment system as claimed in claim 1, wherein the transmitting portion comprises a transmitting ring fixed to the corresponding adjusting knob and the first gear is formed on an outer edge of the transmitting ring.

9. The sensing and adjustment system as claimed in claim 1, wherein the fixing portion comprises an annular fixing frame fixed to the main body of the telescopic sight and provided with fixing holes for receiving the sensing portion and the driving portion therein.

10. The sensing and adjustment system as claimed in claim 1, wherein the fixing portion comprises an annular fixing ring fixed to the main body of the telescopic sight and provided with a protrusion engaged with the central controlling portion.

11. The sensing and adjustment system as claimed in claim 1, wherein the setting portion comprises a second transmission module, a setting program executed by the setting portion and a displaying module; during setting, the first transmission module is connected to the second transmission module and setting steps are set on a setting interface of the displaying module; and the setting data of the sensing portion is set on the central controlling portion via the setting steps so that the central controlling portion calculates the instant adjusting quantity of the adjusting knob according to the setting data.

12. The sensing and adjustment system as claimed in claim 11, wherein the setting steps comprise: setting the lowest point within a certain adjusting range of the adjusting knob, setting the highest point within a certain adjusting range, inputting an adjusting value of the adjusting range, selecting an adjusting unit and setting a starting point within the adjusting range of the adjusting knob.

13. The sensing and adjustment system as claimed in claim 11, wherein the setting steps comprise: setting a marked point of the adjusting scale of the adjusting knob as the N−1th point and inputting the value of the N−1th point read out from the scale; setting a marked point of the adjusting scale of the adjusting knob as the Nth point and inputting the value of the Nth point read out from the scale; obtaining and storing all the marked points on the adjusting scale of the adjusting knob by the central controlling portion; setting the N−1th point of the adjusting scale as a starting point within the calculation range of the sensing portion, and setting the Nth point of the adjusting scale as an end point within the calculation range of the sensing portion, wherein N is an integer greater than or equal to two.

* * * * *